United States Patent
Kobayashi et al.

(10) Patent No.: US 6,539,108 B1
(45) Date of Patent: Mar. 25, 2003

(54) IMAGE PROCESSING DEVICE AND METHOD OF THE SAME

(75) Inventors: Kunihiko Kobayashi, Ebina (JP); Fumihiko Shibata, Ebina (JP); Takeshi Kunimasa, Ebina (JP); Hiroshi Sekine, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/377,859

(22) Filed: Aug. 20, 1999

(30) Foreign Application Priority Data

Aug. 26, 1998 (JP) ............................. 10-239643

(51) Int. Cl.$^7$ ............................................. G06K 9/00
(52) U.S. Cl. ................................................. 382/162
(58) Field of Search ........................... 358/518, 521, 358/523, 524, 525, 1.9, 302, 298; 382/167; 345/603, 604

(56) References Cited

U.S. PATENT DOCUMENTS

| | | | | |
|---|---|---|---|---|
| 5,130,808 A | * | 7/1992 | Kemmochi | 358/298 |
| 5,642,474 A | | 6/1997 | Parkhurst et al. | 395/117 |
| 5,798,842 A | * | 8/1998 | Yamazaki | 358/302 |
| 6,118,548 A | * | 9/2000 | Ryan | 358/1.9 |
| 6,229,915 B1 | * | 5/2001 | Ohkubo | 382/167 |
| 6,268,939 B1 | * | 7/2001 | Klassen et al. | 358/518 |
| 6,310,696 B1 | * | 10/2001 | Kumada | 358/1.9 |
| 2001/0040983 A1 | * | 11/2001 | Nishikawa | 382/109 |

FOREIGN PATENT DOCUMENTS

| | | |
|---|---|---|
| JP | 8-263674 | 10/1996 |
| JP | 9-171564 | 6/1997 |
| JP | 10-51651 | 2/1998 |
| JP | 6-168334 | 6/1999 |

* cited by examiner

Primary Examiner—Joseph Mancuso
Assistant Examiner—Brian Le
(74) Attorney, Agent, or Firm—Morgan, Lewis & Bockius LLP

(57) ABSTRACT

The present invention provides an image processing device that avoids occurrence of unintended color conversion during the logical operation processing, and produces high-resolution images. In the image processing device of the present invention, after an input color conversion unit converts the RGB color space into the CMYK color space, a first color conversion unit executes color conversion of an area subjected to the logical operation processing into the CMY color space, and a logical operation unit executes the logical operation processing. Thereafter, a second color conversion unit executes color conversion of a logical operation result into the CMYK color space. On the other hand, a pixel value comparison unit compares the color values of the CMY color space before and after the logical operation by the logical operation unit; and if coincident, an output image selection unit selects the color values converted by the input color conversion unit as they are. Thereby, as a result of the logical operation, if the color values of the images are not varied, the original color values in the CMYK color space are adopted as the output result; and therefore, there will not be unintended color conversion executed by the first and second color conversion units.

7 Claims, 8 Drawing Sheets

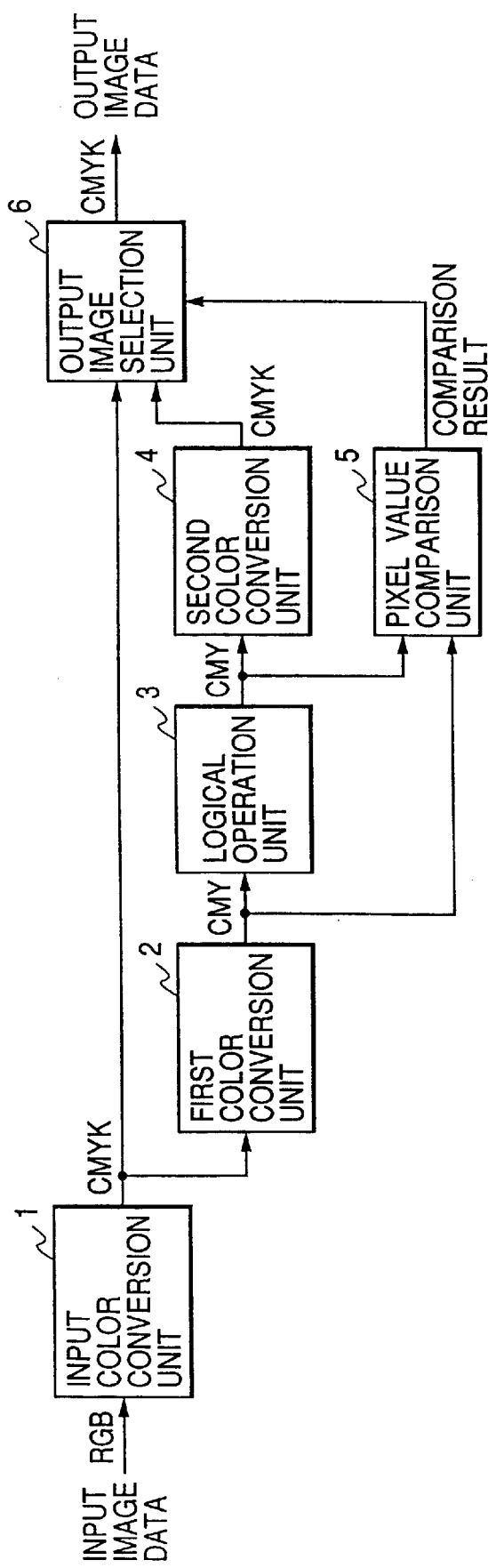

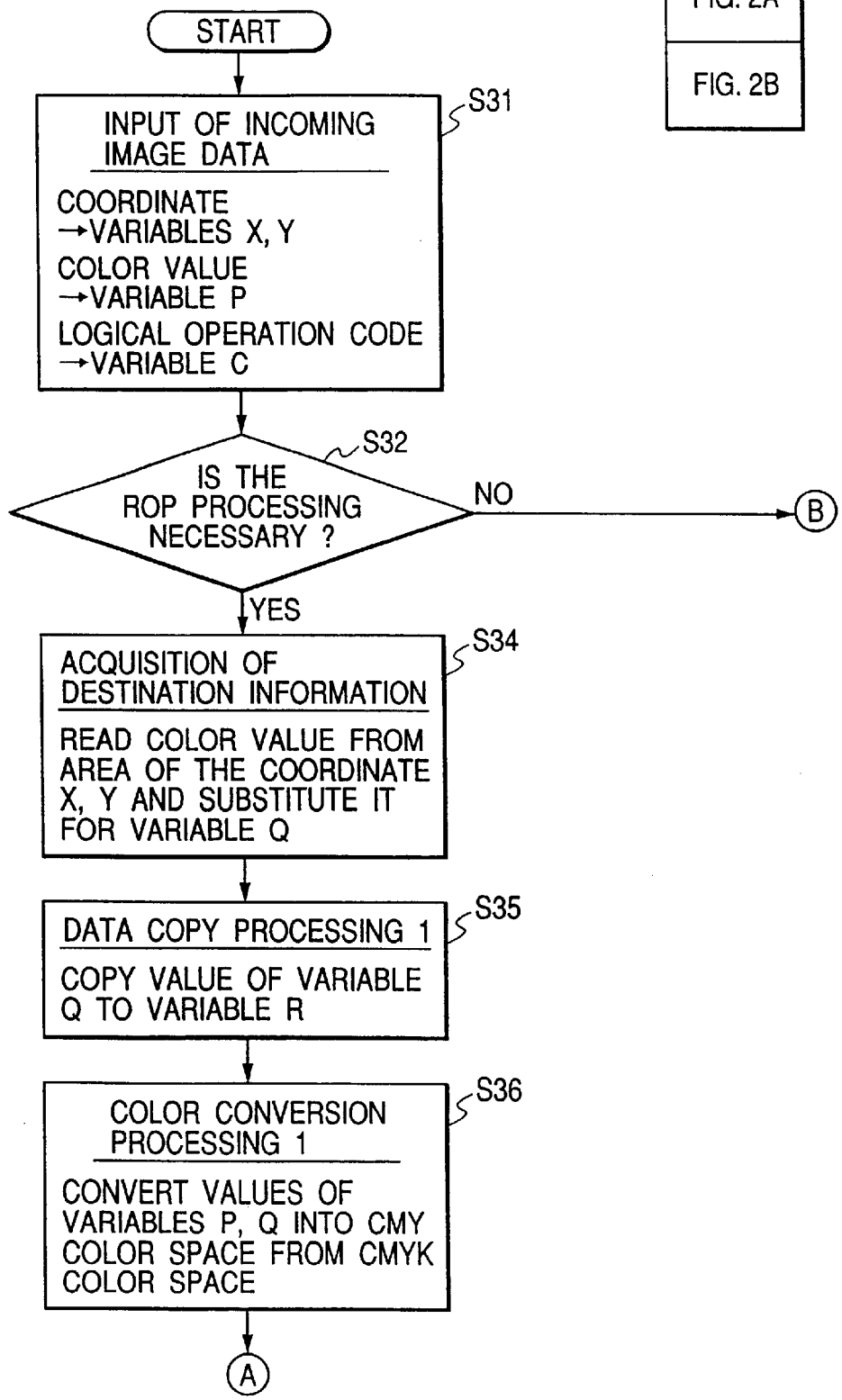

FIG. 4A
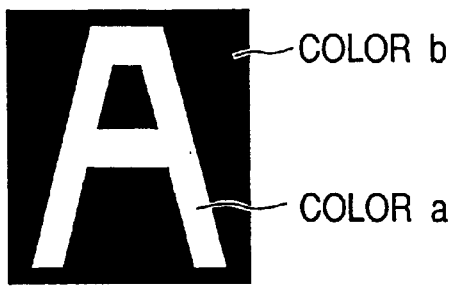
FIG. 4B
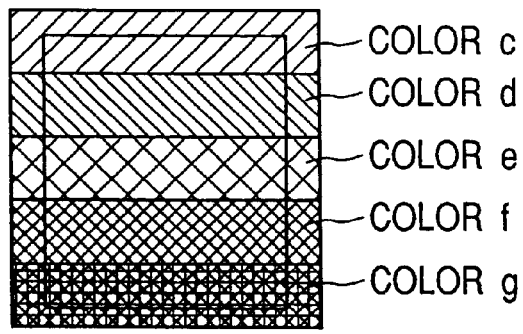
FIG. 4C
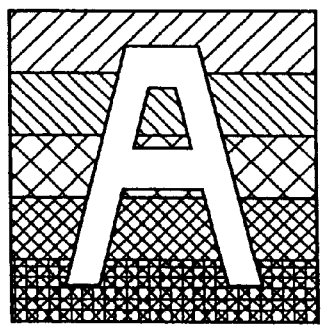
FIG. 4D
| COLOR | CMYK VALUE | CMY VALUE |
|---|---|---|
| a | (000, 000, 000, 000) | (000, 000, 000) |
| b | (000, 000, 000, 255) | (255, 255, 255) |
| c | (040, 000, 000, 010) | (050, 010, 010) |
| d | (080, 000, 000, 010) | (090, 010, 010) |
| e | (120, 000, 000, 010) | (130, 010, 010) |
| f | (180, 000, 000, 010) | (190, 010, 010) |
| g | (220, 000, 000, 010) | (230, 010, 010) |

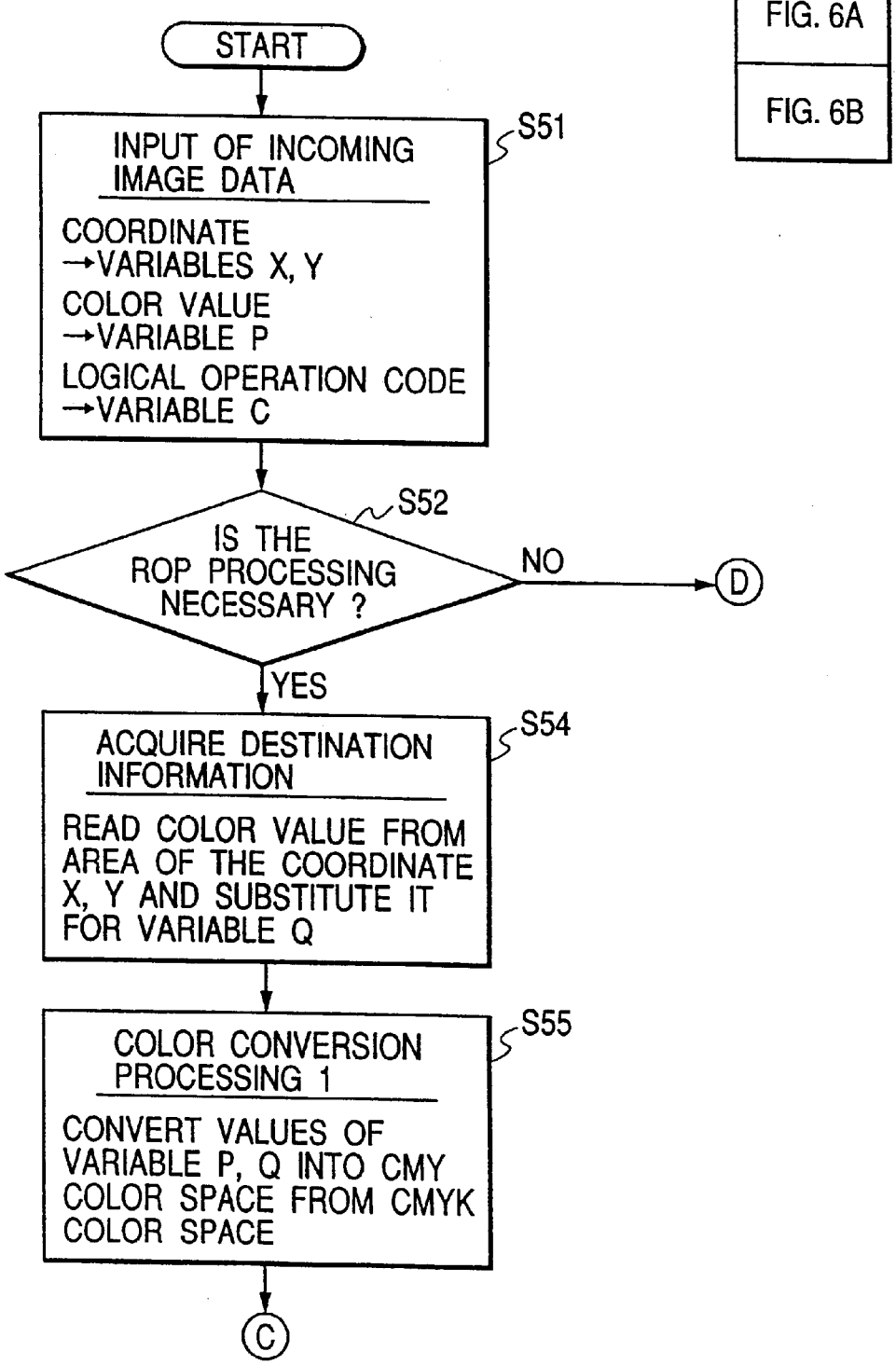

IMAGE PROCESSING DEVICE AND METHOD OF THE SAME

BACKGROUND OF THE INVENTION

1. Field of the Invention

The present invention relates to an image processing device that accepts color image data expressed with arrays of pixels and executes a logical operation.

2. Description of Related Art

Various images are processed in an image processing device that processes various image data transmitted from image creating devices such as a personal computer and the like, and expands them into image data expressed with arrays of pixels that can be printed by a printer. As an example, when a plurality of picture images are mapped to be overlapped, there is processing that interprets a logical operation code to specify a method of superposing a newly written image upon an original image, executes a logical operation according to the method specified in the logical operation code, and superposes the images. This type of logical operation is generally known as the ROP (Raster OPeration) processing.

Originally, this ROP processing was devised for display on a display device of a personal computer or the like, and pixel data for the logical operation is premised to be expressed with the RGB color space. However, printers in general employ the CMYK color space finally, which is different from the space that the ROP processing premises. The ROP processing cannot be performed correctly with the color space that is not primary-independent, such that the K color component is dependent upon the other color components C, M, Y, as the CMYK color space. Accordingly, the execution of the ROP processing to the pixels expressed with the CMYK color space will lead to a result different from the case of the execution to the pixels of the RGB color space.

In view of this, as a method for correctly executing the ROP processing, for example, the following one is known. First, the ROP processing is executed while the image data expressed with the RGB color space is expanded into the pixel data of the RGB color space as it is. And, after the image data in one page is all expanded into the pixel data and the ROP processing is completed, the pixels for one page are converted all together into the CMYK color space. But, this method requires the color conversion of the pixel data expressed with the RGB color space into the pixel data of the CMYK color space all in a pixel unit. As a result, it requires a great amount of time for the color conversion. Moreover, the method will necessarily apply uniform color conversion to the image data, regardless of the types of the image data that the original plotting command indicates. Therefore, it is impossible to select color conversion parameters suited to the types of the image data, which induces the problem of picture quality.

In contrast to this method, the image processing device disclosed, for example, in the Japanese Published Unexamined Patent Application No. Hei 10-51651 employs a method that applies the ROP processing after converting the image data once expanded into the pixel data of the CMYK color space into the CMY color space only for the part that requires the ROP processing, and thereafter converts only the part converted into the CMY color space again into the CMYK color space. According to this method, a higher-speed processing can be expected in comparison to the above-mentioned method that once expands the image data into the pixel data of the RGB color space, and converts all the expanded pixel data into the CMYK color space. Also, this method enables a correct ROP processing, compared to the case of processing the pixel data of the CMYK color space as it is.

FIG. 6 is a flowchart to illustrate one operation example in the conventional image processing device. In this case, as described in the aforementioned document, the objects converted into the CMYK color space are checked to see whether the objects each need the ROP processing, and only when necessary, converted into the CMY color space to have the ROP processing applied, and thereafter again converted into the CMYK color space. As mentioned above, since the ROP processing cannot be correctly executed with the color space that is not primary-independent as the CMYK color space, the objects are converted once into the CMYK color space to have the ROP processing applied.

Incidentally, the objects may be converted once into the RGB color space from the CMYK color space to have the ROP processing applied. And, specially in this case, the flow of the processing is illustrated which plots to input the logical operation code indicating what kind of logical operation is executed with the color values of the CMYK color space at the position of a point (X, Y) in the coordinate system that assumes the horizontal direction and the vertical direction of the image for one page as X axis and Y axis, respectively.

At step S51, the coordinate, color values, and logical operation code of plotting data are inputted. The coordinate is substituted for the variables X and Y, the color values for the variable P, and the logical operation code for the variable C. If there is not specification of the logical operation code, a code indicating "having no specification" is substituted for the variable C.

At step S52, the judgment is made as to whether the ROP processing is necessary. This judgment checks whether the variable C is the code indicating "having no specification". If the ROP processing is judged necessary, the process moves to step S54. And, if it is judged not necessary, the process moves to step S53, where the inputted color data of the CMYK color space stored in the variable P is stored as it is in the area including the position specified by the values of the variables X and Y.

If the ROP processing is necessary, first at step S54, a destination information is acquired. That is, the color data of the CMYK color space is loaded from the area including the position specified by the values of the variables X and Y, and substituted for the variable Q.

Next, at step S55, the color conversion from the CMYK color space into the CMY color space is executed. That is, the values of the variable P representing the color data of the CMYK color space inputted at step S51 are converted into the color data of the CMY color space, and overwritten on the variable P and substituted for it. In the same manner, the values of the variable Q representing the color data of the CMYK color space in the destination information acquired at step S54 are converted into the color data of the CMY color space, and overwritten on the variable Q and substituted for it.

And, at step S56, the ROP processing is executed. First, the type of an actual operation is determined from the values of the variable C representing the logical operation code. The logical operation determined as above is executed between the color components of the variable P representing the color data of the CMY color space in the input data and the variable Q representing the color data of the CMY color space in the destination information. The result is overwritten on the variable P and substituted for it.

At step S57, the color data of the CMY color space stored in the variable P being an operation result is converted into the color data of the CMYK color space, and overwritten on the variable P to be substituted for it. And, at step S53, the color data of the CMYK color space stored in the variable P is stored in the area including the position specified by the values of the variables X and Y. Thus, the ROP processing to the input data is terminated.

FIG. 7 is a chart to explain a concrete example of the images before and after the processing in one operational example of the conventional image processing device. The logical operation of AND is made between the bit map image having the character shape 'A' shown in FIG. 7A and the background image shown in FIG. 7B. The bit map image expressing 'A' shown in FIG. 7A is a rectangular bit map image, and the character part of 'A' is expressed with a color a and the background part is expressed with a color b. The color a is a color such that all the values of each color components in the CMYK color space are '0', that is, it represents white. The color b is a color such that the values of each color components of C, M, Y are '0' and the value of K component is '255', that is, it represents black. All the values of C, M, Y color components of these colors a and b become '0' and '255', respectively, by the color conversion from the CMYK color space into the CMY color space.

The background image shown in FIG. 7B is a gradation image in which the color varies from color c to color g. In the rectangular frames in the drawing, the bit map image shown in FIG. 7A is to be superposed. For the convenience of illustration, the differences of the colors are shown with the differences of the hatching.

The logical operation AND with the value '0' always results in '0', and the operation AND with the value '255' always results in maintaining the original value. Thus, as for the result by the logical operation AND to the bit map image of the CMY color space expressing the character 'A', all the values of the color components C, M, Y always become '0' in the character part 'A'. And, the background part assumes the original background value. This logical operation AND produces an image such that the white character 'A' is mapped on the background image shown in FIG. 7B. And, the gradation from the color c to the color g is to be applied to the peripheral parts of the character 'A' with the original background image as it is.

However in reality, as shown in FIG. 7C, although the white character 'A' is definitely acquired, on the surroundings to the character 'A' inside the rectangular area to which the ROP processing is applied, the color varies in the gradation from the color h to the color l, which results in not being coincident with the gradation from the color c to the color g. In this manner, there occurs a color difference between the area where the ROP processing is executed and the part where the ROP processing is not executed, which is a problem to be solved.

Next, why the background color differs as above will be discussed. Theoretically, the ROP processing in the CMY color space that does not include the K (Chinese ink) component will produce a result equivalent to that in case of the ROP processing in the RGB color space. But, the pixel values once converted into the CMYK color space cannot accurately restore the original pixel values of the CMY color space in one-to-one correspondence to the pixel values of the RGB color space. Also, in case of restoring from the CMYK color space to the RGB color space, the pixel values will differ form the original ones of the RGB color space.

The reason lies in that the conversion from the RGB color space to the CMYK color space does not necessarily correspond one to one, namely, this conversion is irreversible. In the printer, for example, the color conversion coefficients are determined in conformity with the characteristics of the output device connected thereto. For example, where the output device has the characteristic such that it outputs C (cyan) color component with a slightly dark color, a coefficient such that the C color component is converted into the values of a slightly reserved color is selected. Thus, in the conversion from the RGB color space into the CMYK color space, a plotting command including the original pixels varies the coefficient in the color conversion in accordance with the types of plotting objects to be expressed, for example, the raster images, characters, geometrical graphics, and the like, thereby enhancing the picture quality of the images. But, once expanded into the pixel values of the CMYK color space, they have lost the information regarding the types of the objects; accordingly, it is impossible to reconvert by means of the coefficient used for the conversion from the RGB color space into the CMYK color space. In other words, the color conversion from the RGB color space into the CMYK color space in general is irreversible conversion. Therefore, the pixel values converted in reverse from the CMYK color space into the CMY color space, or from the CMYK color space into the RGB color space will be different from the ones the original plotting command intends. Similarly, the color conversion between the CMYK color space and the CMY color space does not correspond one to one, and there occurs a case where the color conversion cannot be determined uniquely.

Thus, when the images of the CMYK color space are converted into the CMY color space, and converted in reverse into the CMYK color space, it is not guaranteed to restore the original values. Accordingly, when the area necessary for the ROP processing of the images once expanded into the pixels of the CMYK color space is reverse-converted into the CMY color space to have the ROP processing applied, and thereafter, reconverted into the pixels of the CMYK color space, this series of the processing will produce the pixel values different from the ones acquired when the ROP processing is applied to the images during expanding them into the pixels with the RGB color space, and thereafter the color conversion is executed to each of the pixels.

Further, as also illustrated in FIG. 7, many cases show that the data written afterward in the ROP processing is the raster images. Here, the plotting command normally intends to vary the pixel values of a part with the ROP processing, but many cases confirm that the part is, as the character 'A' in FIG. 7, a part of the rectangular area, specially an area of an arbitrary shape that is inscribed or contained in the rectangular area. In this case, in the surroundings of the rectangular area being the objects of the ROP processing except for the graphics inscribed or contained therein, it is beyond intention that the pixel values vary before and after the ROP processing. However, the conventional method disclosed in the foregoing document will vary the pixel values of the surroundings due to the irreversibility during the color conversion, as shown in FIG. 7C, which is not intended and desirable. Accordingly, the boundary between the rectangular area having the ROP processing applied and the area in the surroundings thereof not having the ROP processing applied appears on a printed image as a clear difference of the color or density against the original intention of the plotting command, which is the problem to be solved. Specially, the part where the difference of the color or density is clearly seen is, as shown in FIG. 7, where the ROP operation is executed, but the color values do not vary from the original ones of the background image.

The present invention has been made in view of the foregoing circumstances, and it is an object of the present invention to provide an image processing device that makes it possible to avoid the occurrence of unintended color conversion during the logical operation, and to acquire a high-resolution image.

SUMMARY OF THE INVENTION

In the image processing device according to the present invention, the first image data expressed with the first color space are converted into the second image data expressed with the second color space where the logical operation is conducted, before the logical operation is executed. And, the operation results are converted into the third image data expressed with the first color space. The pixel value comparison part compares the pixel values of the second color space before and after the logical operation. In accordance with the comparison result, the output image selection part selects either the first image data or the third image data of the first color space.

For example, after the first image data expressed with the CMYK color space is converted into the second image data expressed with the CMY color space, the logical operation is executed, and the image data is converted again into the third image data expressed with the CMYK color space. The pixel values of the CMY color space before and after the logical operation are compared, and if coincident, the first image data of the CMYK color space is selected.

As discussed above, after the conversion into the CMY color space for the logical operation, the reconversion into the CMYK color space will not necessarily restore the original color. However in the present invention, as to the pixels without variations of pixel values by the logical operation, the first image data is outputted which has not been subjected to the color conversion into the CMY color space. Thereby, the conversion and reconversion of the color space will not create variations of colors, and there will not appear unintended variations of colors, thus producing high-resolution images.

BRIEF DESCRIPTION OF THE DRAWINGS

FIG. 1 is a block diagram to illustrate one embodiment of the image processing device relating to the present invention;

FIGS. 2–2B are flowcharts to illustrate one operational example of the one embodiment of the image processing device relating to the present invention;

FIG. 3 is a chart to explain one example of the AND operation between two values;

FIGS. 4A–4D are charts to explain one example of concrete image processing in the one embodiment of the image processing device relating to the present invention;

FIGS. 6–6B are flowcharts to illustrate one operational example in the conventional image processing device.

DETAILED DESCRIPTION OF THE PREFERRED EMBODIMENT

Figure 2B:
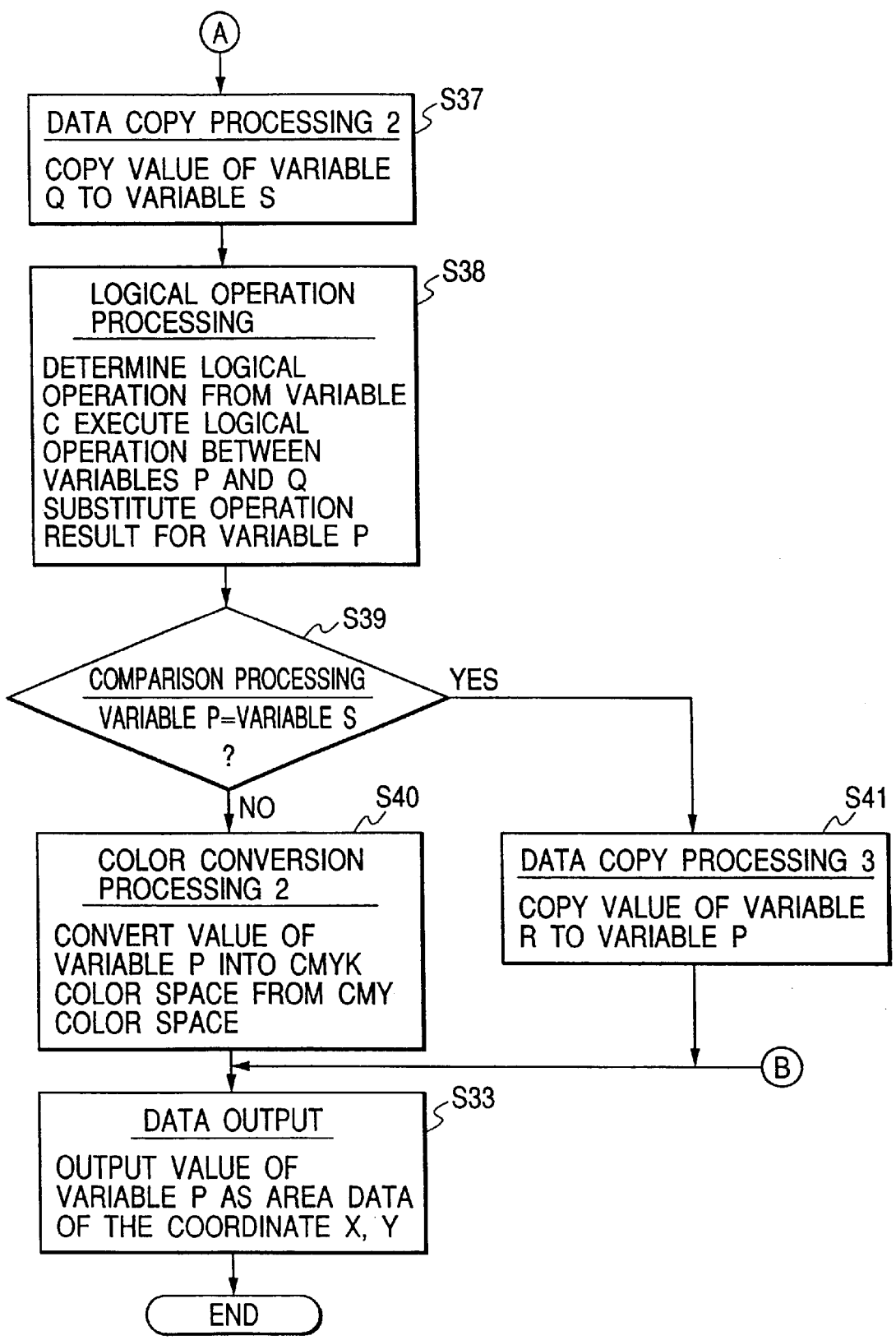

FIG. 1 is a block diagram to illustrate one embodiment of the image processing device relating to the present invention. In the drawing, 1 signifies an input color conversion unit. 2 signifies a first color conversion unit, 3 signifies a logical operation unit, 4 signifies a second color conversion unit, 5 signifies a pixel value comparison unit, and 6 signifies an output image selection unit. Here, a case is illustrated, in which image data expressed with the RGB color space is inputted as input image data, and image data expressed with the CMYK color space is outputted as output image data.

The input color conversion unit 1 converts the input image data expressed with the RGB color space into the image data expressed with the CMYK color space. Naturally, the input color conversion unit 1 is not needed in case that the input data is expressed with the CMYK color space.

The first color conversion unit 2 converts the image data expressed with the CMYK color space into the image data of a color space for executing a logical operation in the logical operation unit 3. In this case, the logical operation unit 3 is assumed to handle the image data expressed with the CMY color space, and the first color conversion unit 2 executes the color conversion of image data from the CMYK color space into the CMY color space. The logical operation unit 3 performs a logical operation, for example, the aforementioned ROP processing to the image data expressed with the CMY color space by the first color conversion unit 2. The second color conversion unit 4 reconverts the image data having the logical operation processed by the logical operation unit 3 into the image data expressed with the CMYK color space.

The pixel value comparison unit 5 compares pixel values before the logical operation in the logical operation unit 3 with pixel values after the logical operation, and outputs the comparison result to the output image selection unit 6. Here, the pixel value comparison unit 5 compares to see whether the pixel values before the logical operation are coincident with the pixel values after the logical operation, and outputs the comparison result of being coincident or not.

The output image selection unit 6 selects either the image data converted into the image data of the CMYK color space by the input color conversion unit 1 not having the logical operation processing applied, or the image data having the logical operation processing applied by the logical operation unit 3, in accordance with the comparison result outputted from the pixel value comparison unit 5, and outputs it as the output image data.

FIG. 2 is a flowchart to illustrate one operational example of the one embodiment of the image processing device relating to the present invention. To sum up of this operational example, the judgment of the objects converted into the CMYK color space as to whether the ROP processing is necessary or not is executed to each of them, and only when necessary, the color conversion into the CMY color space is made to perform the logical operation. Thereafter, employing the technique to reconvert it into the CMYK color space, if the color values of the image are not varied after the logical operation, the original color values with the CMYK color space are to be adopted as the output result.

Figure 6B:
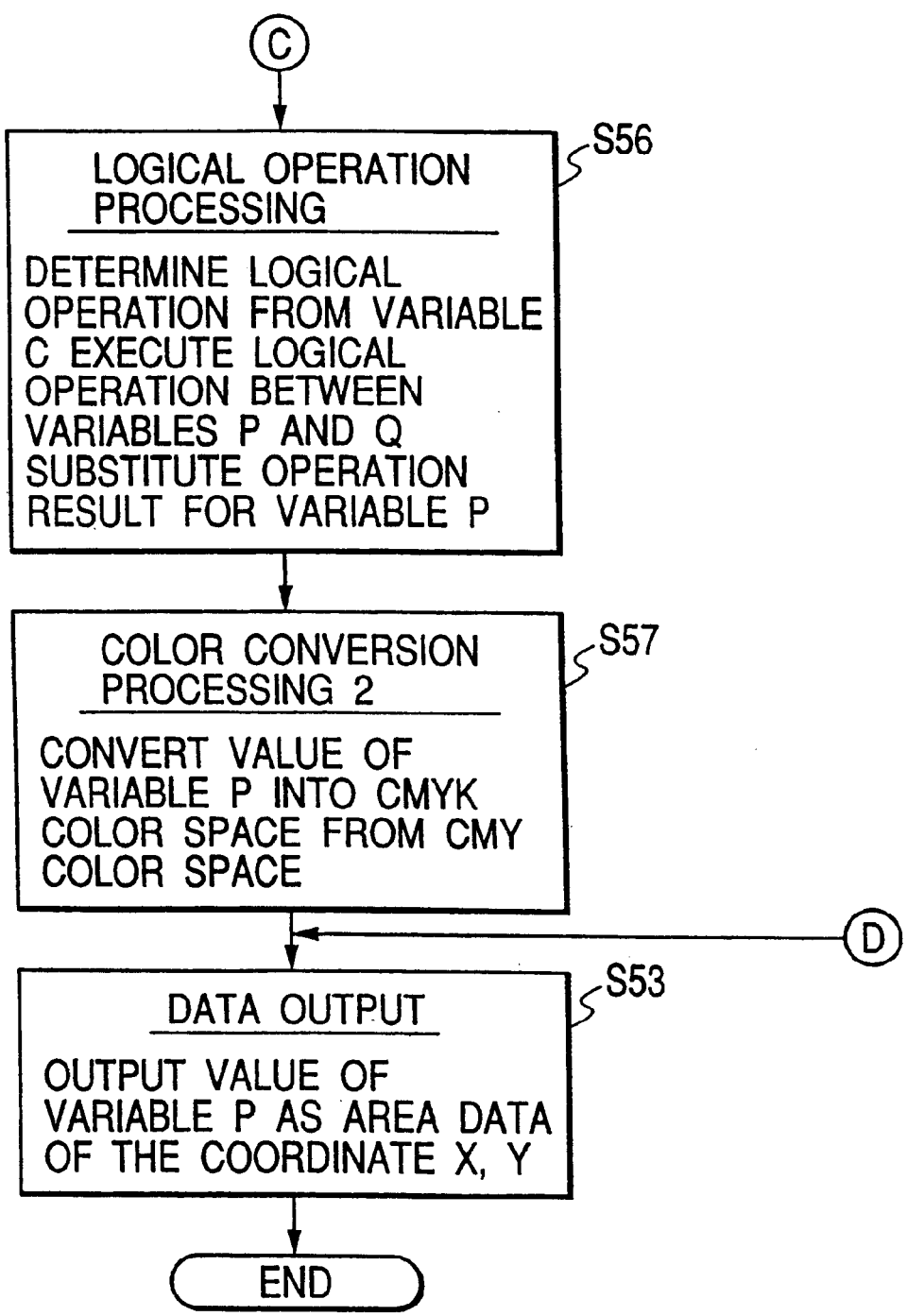

In the following explanation, in the same manner as in the conventional example shown in FIG. 6, the logical operation code is premised to be given as the input image data, indicating what kind of logical operation is executed with the color values of the CMYK color space at the position of a point (X, Y) in the coordinate system that assumes the horizontal direction and the vertical direction of the image for one page as X axis and Y axis, respectively. That is, the input image data is assumedly the data to which the input color conversion unit 1 has executed the color conversion into the CMYK color space. Also, the image for one page is assumedly stored as destination information, for example, in a page buffer or the like. This destination information is also assumed to contain the image data which was converted into the CMYK color space by the input color conversion unit 1.

At step S31, the coordinate, color values, and logical operation code of plotting data is inputted as the input image data. The coordinate is substituted for the variables X and Y, the color values for the variable P, and the logical operation code for the variable C. If there is not specification of the logical operation code, a code indicating "having no specification" is substituted for the variable C.

At step S32, the judgment is made as to whether or not the ROP processing is necessary. This judgment needs to check whether the variable C is the code indicating "having no specification". If the logical operation processing is judged necessary, the process moves to step S34. And, if it is judged not necessary, the process moves to step S33, where the color values substituted for the variable P are stored at the position indicated by the coordinate X, Y, and the processing is terminated. In this case, the output image selection unit 6 has selected the output of the input color conversion unit 1 and outputted it.

If the logical operation processing is necessary, first at step S34, destination information is acquired. That is, the color values of the CMYK color space are read from the area including the position specified by the values of the variables X and Y, and substituted for the variable Q. Further, at step S35, the values of the variable Q are copied to the variable R. Since the values of the variable Q are the color values of the CMYK color space acquired from the destination information, the color values before the color space conversion for the logical operation processing are to be stored.

At step S36, the values of the variable P representing the color values of the CMYK color space in the input image data are converted into the color values of the CMY color space, and overwritten on the variable P to be substituted for it. In the same manner, the values of the variable Q representing the color values acquired from the destination information are converted into the color values of the CMY color space, and overwritten on the variable Q to be substituted for it. Further, at step S37, the values of the variable Q indicating the color values after the conversion into the CMY color space are copied to the variable S. Thereby, the color values before the logical operation processing and after the conversion into the CMY color space are to be stored as the values of the variable S.

And, at step S38, the logical operation unit 3 determines the type of an actual logical operation from the values of the variable C representing the logical operation code. Here, if the logical operation defined by the RGB color space as the ROP processing is processed with the CMY color space, it will be necessary to convert the logical operation code in which the processing with the RGB color space is assumedly set into the logical operation code for the CMY color space, based on a predetermined logical operation code correspondence table. And, the logical operation unit 3 executes, according to the determined type of logical operation, a logical operation between the color components of the variable P representing the color values of the CMY color space acquired from the input image data and the variable Q representing the color values of the CMY color space acquired from the destination information. The operation result is overwritten on the variable P and substituted for it.

At step S39, the pixel value comparison unit 5 compares the variable P representing the color values of the CMY color space acquired as the result of the logical operation with the variable S representing the color values of the CMY color space before the logical operation acquired from the destination information having been copied at step S37. If both of the color values are completely coincident, the process moves to step S41. If not, on the contrary, the process moves to step S40.

As a result of the comparison at step S39, if the variable P is not coincident with the variable S, at step S40, the color values of the CMY color space stored in the variable P are converted into the color values of the CMYK color space by the second color conversion unit 4, and overwritten on the variable P to be substituted for it. That is, the output image selection unit 6 has selected the color values after the color space conversion by the second color conversion unit 4 of the logical operation result outputted from the logical operation unit 3.

As a result of the comparison at step S39, if the variable P is coincident with the variable S, at step S41, the values of the variable R are copied to the variable P. Since the variable R expresses the color values of the CMYK color space acquired from the destination information before the color conversion, the color values completely identical to the original ones of the image from the destination information are to be substituted for the variable P. That is, the output image selection unit 6 has selected the color values in which the logical conversion is not executed to the output from the input conversion unit 1. At step S33, the color values of the CMYK color space stored in the variable P are outputted as the image data at the position indicated by the values of the variables X and Y, and the processing is terminated.

As to the part not varied by the logical operation processing, since the original color values before the color conversion by the first color conversion unit 2 are preserved by this processing, it is possible to avoid the problem of the color or density difference from appearing in the object area for the logical operation processing and other areas, which is usual with the conventional technique, and to acquire an output result which is approximate to the originally assumed one.

The foregoing operation will now be described with a concrete example. As the concrete example, a coordinate (X, Y)=(100, 100) as the input image data after the color conversion by the input color conversion unit 1, and a code indicating the AND operation as the logical operation code are assumed to be given. Also, a color representing the black in the CMYK color space is assumedly given. If the color components are each assumed to take the values 0–255, the black in the CMYK color space normally takes the values (C, M, Y, K)=(0, 0, 0, 255). Further, as the destination information, an arbitrary color is assumedly given to the coordinate (X, Y)=(100, 100) in the CMYK color space. First, at step S31, 100 is substituted for the variable X, 100 for the variable Y, color values representing the black for the variable P, and a logical operation code indicating the AND operation for the variable C. At step S32, since the AND operation is designated as the logical operation code, the process advances to step S34 for the logical operation.

At step S34, the color values of pixels corresponding to the position of the coordinate (x, Y)=(100, 100) are read from the destination information in the page buffer, for example, and the color values are substituted for the variable Q. Further, these values are copied also to the variable R at step S35.

At step S36, the color values in the CMYK color space that are substituted for the variable P and the variable Q are converted into the color values in the CMY color space. Since the color values representing the black in the CMYK color space, for example, (C, M, Y, K)=(0, 0, 0, 255) are stored in the variable P, these are converted into the black in the CMY color space, for example, (C, M, Y)=(255, 255, 255), which are stored afresh in the variable P. The similar processing being made also with the variable Q, the color values are converted into those in the CMY color space to be stored in the variable Q, and at step S37, they are copied to the variable S as well.

At step S38, the logical operation is conducted. Since the logical operation code indicating the AND operation is stored here in the variable C, the AND operation between the variable P and the variable Q is to be conducted. FIG. 3 is a chart to explain one example of the AND operation between two values. This chart shows an example of the AND operation between the two values expressed with eight bits that can take on the values from 0 through 255, between the source data and destination data. Here, the value of the source data is '150', the value of the destination data is '200', and the logical operation is AND. Once, these data pieces are each expressed with binary numbers, and then the AND operation between the digits of these numbers is conducted in accordance with the rule of the Boolean algebra. As a result, the values '10000000' in the binary and '128' in the decimal can be acquired. In the example shown in FIG. 3, the data is expressed in eight bits, however, the logical operation can be made through a similar process with the expression of the other bit sizes.

Here, the AND operation is made to the values expressed with the CMY color space, for example. In this case, the logical operation as shown in FIG. 3 is to be conducted to each component of C, M, Y of the color values stored in the variable P and the variable Q. Here, in the variable P are stored the color values of the black, namely, the color values in which all the bits take 1. Accordingly, the AND operation between the variable P and the variable Q will produce the same color values as those of the variable Q as an operation result. This operation result is substituted for the variable P.

At step S39, the variable P and the variable S are compared. The color values that had been stored in the variable Q before the logical operation have been copied to the variable S. As mentioned above, the color values of the variable Q are stored as they are in the variable P through the AND operation. Therefore, the comparison at step S39 judges that the variable P coincides with the variable S. In this case, the color values of the variable R is copied to the variable P at step S41, and the color values stored in the variable P at the position of the coordinate (X, Y)=(100, 100) are outputted at step S33. Since the color values read from the destination information before the color conversion into the CMY color space are stored as they are in the variable R, they are not influenced during the color conversion by the first color conversion unit 2 and the second color conversion unit 4, and the original color values are outputted as they are. Thereby, although the area is subjected to the logical operation, the background image is actually outputted as it is, in regard to the area in which the background image is expectedly outputted as it is. Therefore, the difference of the color or density is not created as in the conventional system, which enables the acquisition of high-resolution images.

Figure 7A:
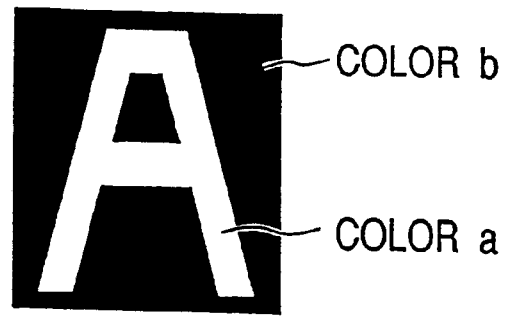
FIGS. 7A–7C are charts to explain a concrete example of an image before and after processing in the operational example of the conventional image processing device.
Figure 7B:
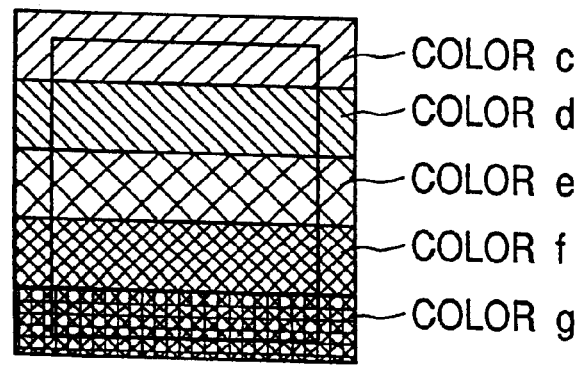
Figure 7C:
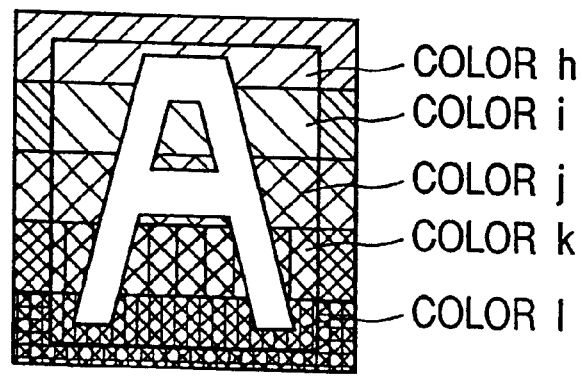

FIG. 4 is a chart to explain one example of a concrete image processing in the one embodiment of the image processing device relating to the present invention. For the convenience of drawing, the differences of the colors are shown in the drawing with the differences of the hatching. This example illustrates a case in which the same image as the one shown in the foregoing FIG. 7A, FIG. 7B is processed by using the one embodiment of the image processing device of the present invention. FIG. 4A illustrates the bit map image having the character shape 'A' in the same manner as FIG. 7A. The character part 'A' is expressed with the white having C, M, Y, K color components as '0', and the other part is expressed with the black having C, M, Y color components as '0' and k color component as '255'. And, FIG. 4B illustrates a gradation image, in the same manner as FIG. 7B, in which the color changes from the color c to the color g. Here, the image shown in FIG. 4B is stored as the destination information in a page buffer, for example. The logical operation code is assumed to indicate the AND operation.

FIG. 4D illustrates the color values in the CMYK color space of each colors which are employed in FIG. 4A and FIG. 4B, and the color values after being converted into the CMY color space to execute the logical operation. As for the color a (white) used in FIG. 4A, the color values after converted into the CMY color space are '0' for each C, M, Y color components. And, as for the color b (black), the color conversion into the CMY color space changes the values of C, M, Y color components into '255'.

In the AND operation, as described with FIG. 3, the AND operation is carried out for each of the bits. Therefore, the AND operation of the color a (white) part in FIG. 4A always results in '0'. Also, the AND operation of the color b (black) part in FIG. 4A always takes the original values. Namely in this example, all of C, M, Y color components always become '0' in the part of the character 'A', which effects a clear-cut white, and the background part assumes the original values. Since the objects of the operation are the color values converted into the CMY color space, they are the color values on the right column in FIG. 4D. As for the background part, the color values of the CMY color space from the color c through the color g are to be outputted as the operation result.

When the color values of the CMY color space of the background part are outputted as the operation result, if these color values are reconverted into the color values of the CMYK color space, there will be a case where they will not restore the original color values of the CMYK color space, as mentioned above. In other words, the color values of the CMY color space on the right column in FIG. 4D are the ones into which the color values on the left column of the CMYK color space are converted. However, if the color values on the column of the CMY color space are converted into those of the CMYK color space, there will be a case where they are not coincident with the color values indicated on the column of the CMYK color space. For example, if the color c is converted into the CMY color space and reconverted into the CMYK color space, there will be a case where the color c is converted, for example, into the color h.

The present invention intends to prevent the color change that is not intended as such. As a result of the logical operation, if the background part is outputted as it is, this is detected by the coincidence of the color values before and after the logical operation, and the original color values on the column of the CMYK color space in FIG. 4D are outputted without using the color values reconverted from the CMY color space. Thereby, with regard to the background part indicated by the color b in FIG. 4A, the color c through the color g shown in FIG. 4B are outputted in the color values of the CMYK color space as they are. Therefore, the image as shown in FIG. 4C can be gained.

With regard to the image gained, regardless of whether or not it is an area subjected to the logical operation, the color values shown in FIG. 4B are outputted to the background part. Therefore, there will not be created a difference of the color or density on the boundary between the area subjected to the logical operation processing and other areas. Thereby, a high-resolution image can be gained.

In the foregoing example, the color conversion is conducted into the CMY color space from the CMYK color space, before the logical operation is performed. However, the color conversion may be conducted, for example, into the RGB color space, before the logical operation is performed. In such a case that defines the logical operation in the RGB color space as the ROP processing and the like, the conversion of the logical operation code into the inner code or the like is not required, and the logical operation code can be processed as it is. And, even in a case where the input image data is not that of the RGB color space, the input color conversion unit 1 is only needed to conduct the conversion of the color space corresponding to that of the input image data. Further, the color space of the output image data is not limited to the CMYK color space, and the present invention is applicable in an arbitrary color space.

Figure 5:
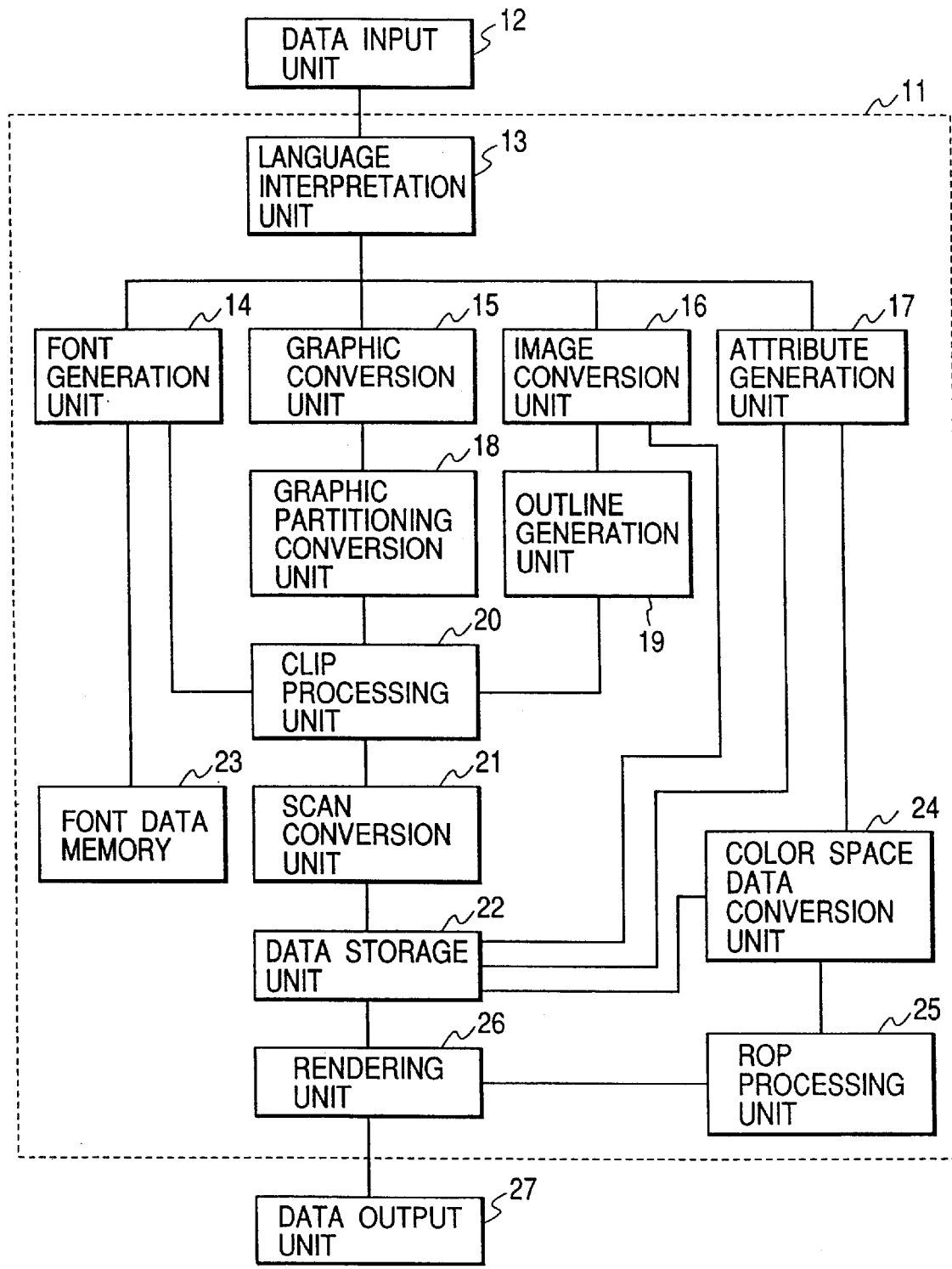
FIG. 5 is a block diagram of an image processing system showing an applied example of the image processing device relating to the present invention.

FIG. 5 is a block diagram of an image processing system showing an applied example of the image processing device relating to the present invention. In the drawing, 11 denotes the image processing system, 12 a data input unit, 13 a language interpretation unit, 14 a font generation unit, 15 a graphic conversion unit, 16 an image conversion unit, 17 an attribute generation unit, 18 a graphic partitioning conversion unit, 19 an outline generation unit, 20 a clip processing unit, 21 a scan conversion unit, 22 a data storage unit, 23 a font data memory, 24 a color space data conversion unit, 25 a ROP processing unit, 26 a rendering unit, and 27 a data output unit. In this example, the data sent from the host computer and the like is accepted by the data input unit 12 to be transferred to the image processing system 11, where the expansion and color conversion of the image data and the like are performed and outputted from the data output unit 27.

The data input unit 12 receives data transmitted from the host computer, and occasionally stores a plurality of input data pieces and performs conditioning for a smooth processing thereafter. Input data is classified into the fonts, graphics, images, and other attribute data by the language interpretation unit 13. The classified data is transferred to the data conversion/generation units intended to carry out each processing together with necessary information.

First, in case of a font, the data thereof is passed to the font generation unit 14. The font generation unit 14 generates a font by means of the data passed and the data stored in the font data memory 23 provided in advance inside the image processing system 11.

And, in case that the input data is classified into the graphic data by the language interpretation unit 13, the data is passed to the graphic conversion unit 15. The graphic conversion unit 15 conducts the coordinate conversion from the coordinate of the coordinate space of the input data into that of the coordinate space of the output data. The graphic partitioning conversion unit 18 partitions the data having the coordinate conversion applied into plural sets of simple graphics which are more approximate to the output data than the data at the input stage. The simple graphics may be the data such that start points and end points are continuous for each scan line, for example, the data described in the Japanese Published Unexamined Patent Application No. Hei 6-168334, or the geometrical sets of data, such as triangles or trapezoids.

And, in case that the input data is interpreted as image data by the language interpretation unit 13, the data are sent to the image conversion unit 16. The image conversion unit 16 executes the expansion, contraction, and rotation of images, etc., in order to convert the coordinate from the coordinate space of the input image data to the coordinate space of the output data. And, in order to convert the color space with which the pixel value of an image is defined into the color space of the output data, the color space data conversion unit 24 converts all the pixel values into the pixel values of the color space of the output data. Furthermore, the outline generation unit 19 generates outline data to express the outline and shape of the image.

Next, in case that the input data is interpreted as data other than the shapes of graphics such as data to designate color values or output modes in relation to the fonts and graphics by the language interpretation unit 13, the data is passed to the attribute generation unit 17. Here, in case of the data to designate the color values, the color space data conversion unit 24 converts the color space into that of the output data to modify the data into a data storable format, and the modified data is passed to the data storage unit 22 as they are.

This processing being carried out, next, the fonts, graphics, and image outline data is passed to the clip processing unit 20. The clip processing unit 20 cuts out, for example, extruded graphics out of the page, or clips the graphics in a free shape area set in advance. Thereafter, the scan conversion unit 21 converts the data having such clipping processing applied into a format that is suitable for preserving the data in the data storage unit 22. This conversion processing can take on a data format such that the start point and length of each scan line are expressed with the cell corresponding to the size thereof, as described, for example, in the Japanese Published Unexamined Patent Application No. Hei 9-171564. This data format is suitable for sequentially preserving the images as this image processing system.

After the data is preserved through the foregoing processing in the data storage unit 22, receiving a data output instruction from the attribute generation unit 17, the data storage unit 22 transfers the preserved data to the rendering unit 26. The rendering unit 26 converts the data into the data of which format the data output unit 27 is to receive. For example, when the data output unit 27 receives the data of the bit map format, the rendering unit 26 converts the data into the bit map format using the page buffer for one page. The storage unit 22 preserves the designations of logical operations between the graphics, and when a logical operation is designated, this processing is executed by the ROP processing unit 25. In this manner, the output data converted into the data format to be received by the data output unit 27 is outputted through the data output unit 27.

In the image processing system having such a construction, the color space data conversion unit 24 can be implemented by the input color conversion unit 1 in the image processing device of the present invention as shown in FIG. 1, and the ROP processing unit 25 can be implemented by the units other than the input color conversion unit 1. Thus, when there exists a part not converted into an area where the ROP processing unit 25 executes the logical operation, the incorporation of the image processing device of the present invention into the system will prevent the discrepancies of variations of colors, etc., by the logical operation of that area.

Further, the image processing system can be applied to an image formation system. For example, connecting a printer engine as the data output unit 27 or following the data output unit 27 will make it possible to form the images processed by the image processing system on a recording media. In this case, the provision of the image processing device of this invention will prevent the occurrence of the unintended variations of colors on the background part during the logical operation, thus enabling the acquisition of high-resolution print images.

As clearly understood from the above discussion, although the image is included in an area subjected to the logical operation processing, if the variations-of the pixel values thereof are not created in practice by the logical operation processing after the color conversion, the original pixel values before the color conversion are preserved as they are. Therefore, unintended variations of colors will not be created by the logical operation processing, and high-resolution images can be gained. Further, in the present invention, since only the area required for the logical operation is converted from the first color space into the second color space where the logical operation is executed, the color conversion required is limited to a minimum area, and accordingly the time required for the color conversion can be minimized. In consequence, the image processing including the logical operation can be carried out at high speed, and thereby is produced an effect that makes both the high-speed processing and the high-resolution image processing compatible.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image processing device comprising:
   a first color conversion part that converts first image data expressed with a first color space into second image data expressed with a second color space different from said first color space;
   a logical operation part that executes a logical operation between pixels overlapped in the second image data expressed with said second color space and varies pixel values of the second image data;
   a second color conversion part that converts the image data acquired from the logical operation by said logical operation part into third image data expressed with the same color space as the first color space;
   a pixel value comparison part that compares the pixel values before and after the logical operation; and
   an output image selection part that selectively outputs either said first image data or said third image data in accordance with a comparison result by said pixel value comparison part.

2. The image processing device according to claim 1, wherein said first color space is the CMYK color space, and said second color space is the CMY color space.

3. The image processing device according to claim 1, wherein the logical operation executed in said logical operation part is the ROP processing.

4. The image processing device according to claim 1, comprising a third color conversion part that converts fourth image data expressed with a third color space different from said first and second color spaces into said first image data expressed with said first color space.

5. The image processing device according to claim 4, wherein said first color space is the CMYK color space, said second color space is the CMY color space, and said third color space is the RGB color space.

6. An image processing device according to claim 1, wherein said pixel value comparison part compares whether the pixel values before and after said logical operation are coincident or not, and said output image selection part outputs to select said first image data when the comparison result by said pixel value comparison part indicates that the pixel values before and after said logical operation are coincident.

7. An image processing method comprising the steps of:
   converting first image data expressed with a first color space into second image data expressed with a second color space different from said first color space;
   executing a logical operation between pixels overlapped in the second image data expressed with said second color space and varying pixel values of the second image data;
   converting the image data acquired from said logical operation into third image data expressed with the same color space as said first color space;
   comparing said second image data before said logical operation and the pixel values of the image data after said logical operation in said second color space; and
   selectively outputting either said first image data or said third image data in accordance with a comparison result.

\* \* \* \* \*